Figure 1:
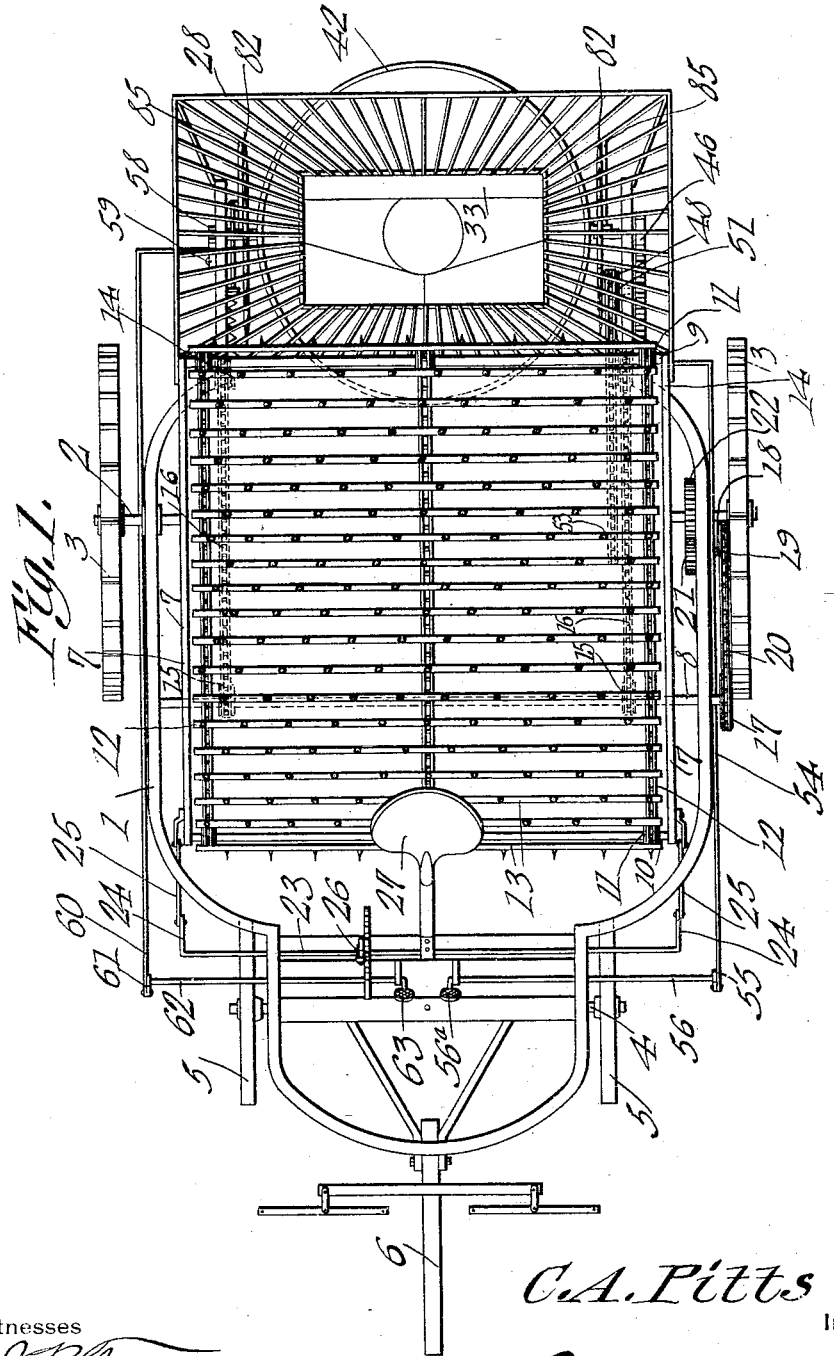

C. A. PITTS.
HAY GATHERER AND COCKER.
APPLICATION FILED SEPT. 11, 1915.

1,197,762.

Patented Sept. 12, 1916.
4 SHEETS—SHEET 1.

Witnesses
J. R. Davis
R. L. Parker

C. A. Pitts
Inventor by C. A. Snow & Co.
Attorneys

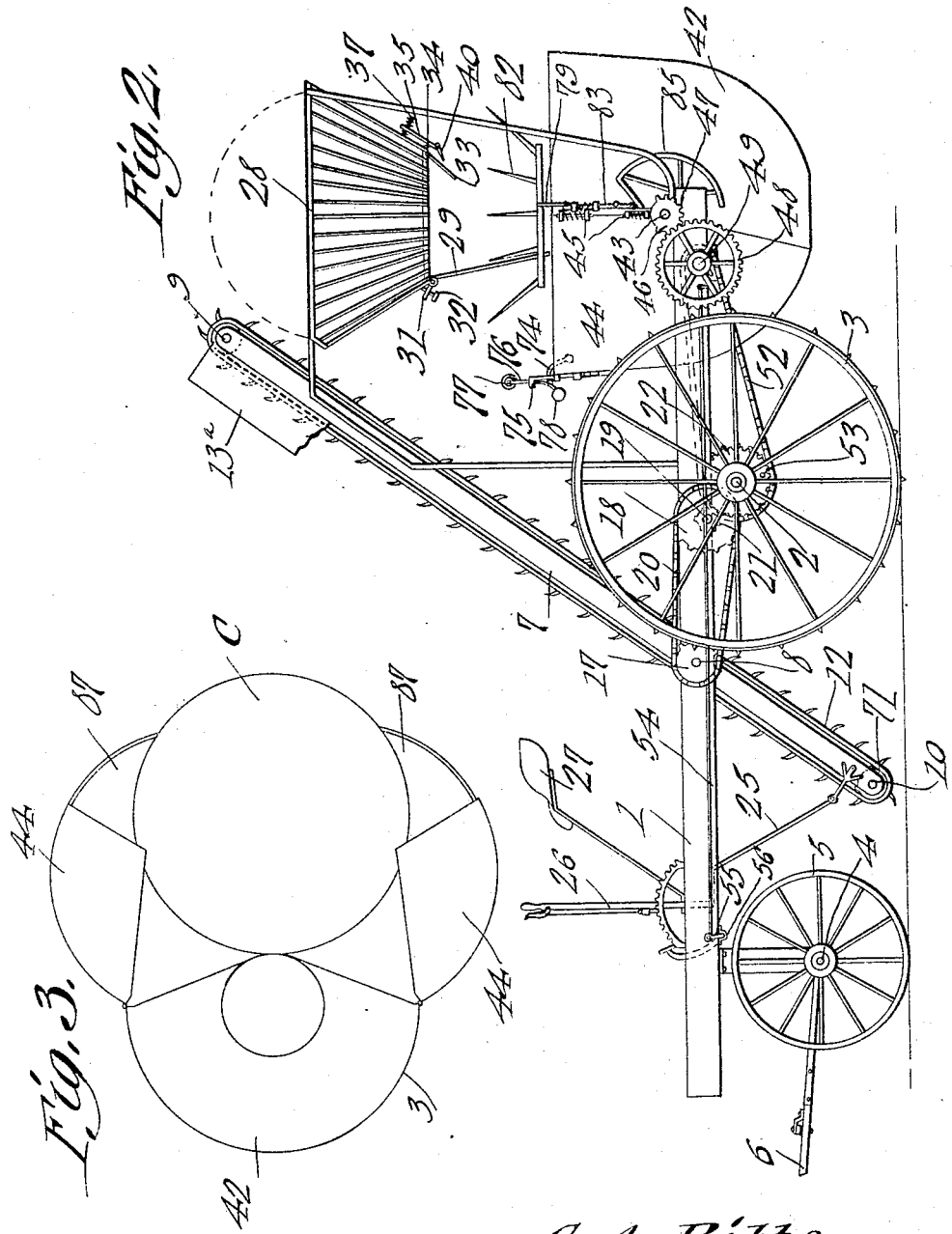

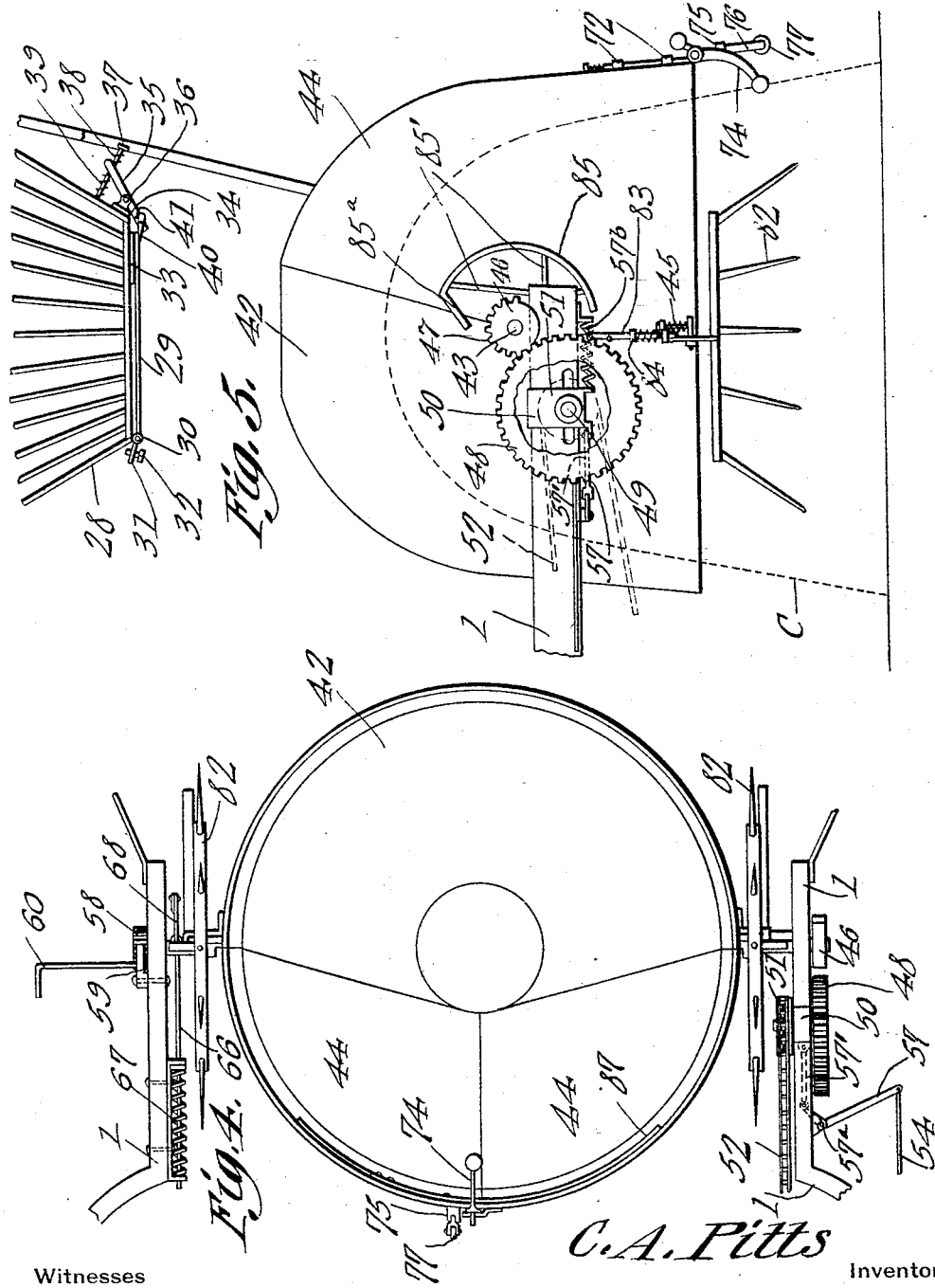

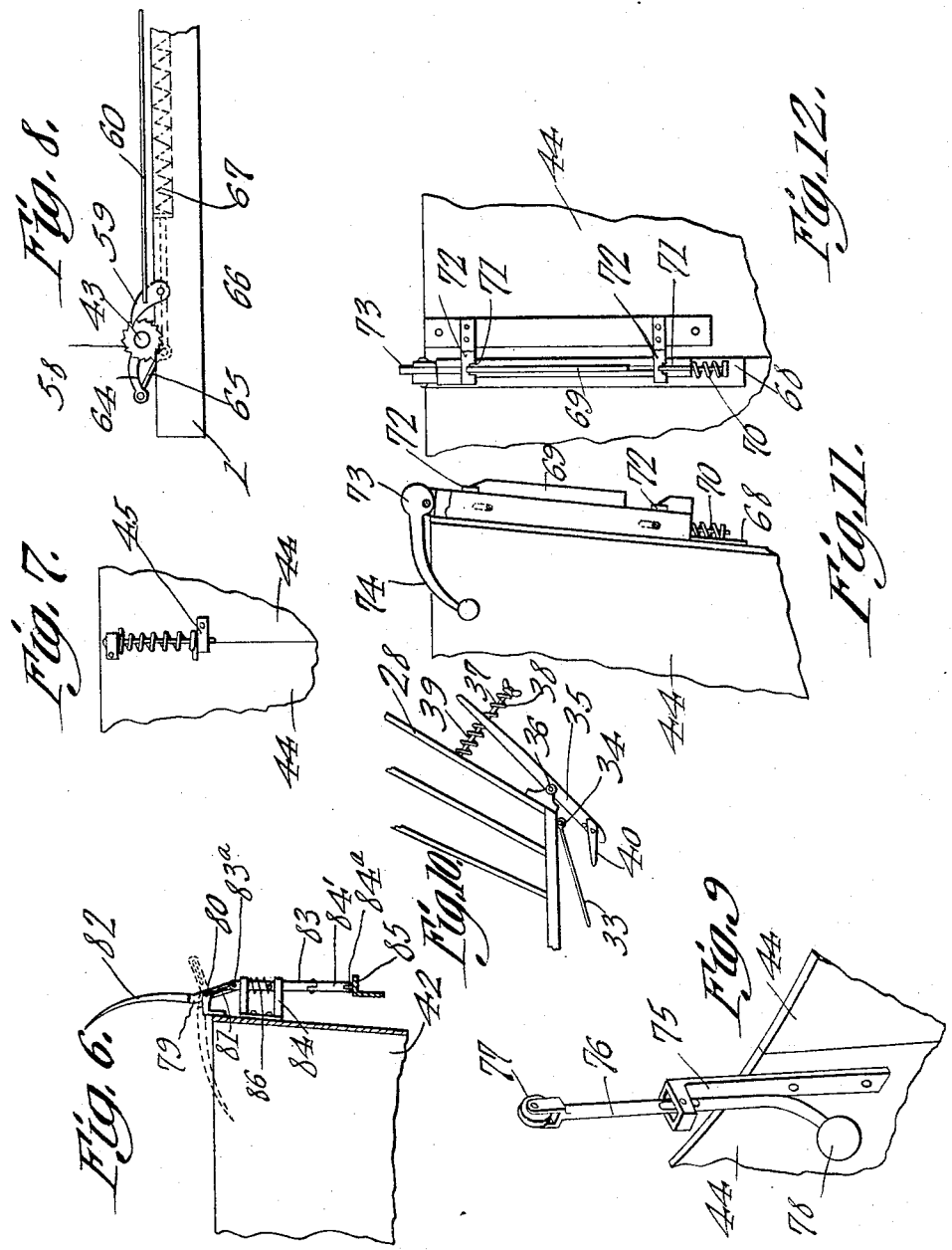

UNITED STATES PATENT OFFICE.

CHARLES A. PITTS, OF CALLAHAN, CALIFORNIA, ASSIGNOR OF ONE-FOURTH TO JOHN H. FACEY, OF CALLAHAN, CALIFORNIA.

HAY GATHERER AND COCKER.

1,197,762.  Specification of Letters Patent.  Patented Sept. 12, 1916.

Application filed September 11, 1915. Serial No. 50,205.

*To all whom it may concern:*

Be it known that I, CHARLES A. PITTS, a citizen of the United States, residing at Callahan, in the county of Siskiyou and State of California, have invented a new and useful Hay Gatherer and Cocker, of which the following is a specification.

The present invention is an appliance for gathering and cocking hay, and aims to provide a novel and improved machine of that character, having unique features of construction and operation.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:—

Figure 1 is a plan view of the machine. Fig. 2 is a side elevation thereof. Fig. 3 is a plan view of the hay receptacle in inverted position and in the act of leaving the cock. Fig. 4 is an enlarged plan view of the hay receptacle and accompanying parts. Fig. 5 is a side elevation illustrating the hay receptacle in inverted position. Fig. 6 is a detail view illustrating one of the forks for holding the hay within the hay receptacle while said receptacle is being inverted. Fig. 7 is a detail view illustrating one of the spring hinges of the receptacle doors. Fig. 8 is a detail view illustrating the means for controlling the return movement of the hay receptacle. Fig. 9 is a perspective view of the device carried by the hay receptacle for closing the door of the hopper. Fig. 10 is a fragmental detail illustrating the means for normally holding the hopper door closed. Fig. 11 is a side elevation of the latch for normally latching the doors of the hay receptacle together, and Fig. 12 is another elevation of the said latch.

The machine includes a suitable wheel-mounted frame 1 to which a rotatable rear axle 2 is journaled, ground wheels 3 being secured upon the ends of said axle. A front axle 4 is pivoted to the forward end of the frame and has the front wheels 5 journaled for rotation thereon, and a tongue 6 is attached to the front axle 4 to enable the vehicle to be drawn by draft animals, although it will be apparent that the vehicle may be moved over the ground in any suitable manner.

Disposed within the frame 1 is a hay gatherer and elevator embodying a swinging frame, said frame being composed of rearwardly inclined bars 7 pivotally engaged between their ends upon a transverse shaft 8 journaled to the frame in front of the rear axle 2. A transverse shaft 9 is journaled to the upper ends of the bars 7, and a similar shaft 10 is journaled to the lower ends of said bars, sprocket wheels 11 being secured upon said shafts 9 and 10 and endless chains 12 being trained around the sprocket wheels. Transverse slats 13 are secured to the chains 12 to provide an endless elevator belt, the slats 13 having spring teeth or spurs for engaging the hay and carrying the hay upwardly with the upper run of the belt which moves upwardly. Upstanding sides 13ª are carried by bars 7.

As a means for actuating the gathering and elevating belt through the medium of the shaft 8 upon which the frame bars 7 are mounted for oscillation, sprocket wheels 14 are secured upon the shaft 9 and sprocket wheels 15 are secured upon the shaft 8, and sprocket chains 16 being passed around the sprocket wheels 14 and 15 for operatively connecting the shafts 9 and 8. Thus, when the shaft 8 is rotated, the shaft 9 will be rotated for operating the elevator belt. A sprocket wheel 17 is secured upon one end of the shaft 8 and a sprocket wheel 18 is secured to a short shaft 19 which is journaled through one side member of the frame 1, and a sprocket chain 20 being trained around the sprocket wheels 17 and 18. A spur gear 21 is secured to the shaft 19 and intermeshes with a spur gear 22 secured to the axle 2, whereby rotatory movement will be transmitted from the axle 2 to the shaft 8 and thence to the shaft 9 which operates the belt.

An adjusting device is employed for swinging the elevator frame to bring the lower end thereof close adjacent or farther from the ground, or to accommodate the particular ground over which the machine is moved, and to this end a transverse rock shaft 23 is journaled upon the forward portion of the frame 1 and has rearwardly projecting arms 24 which are connected by links 25 with the lower ends of the bars 7. The rock shaft 23 has an upstand hand lever 26 adjacent the operator's seat 27 carried by the forward portion of the frame, whereby the operator can readily swing the lever 26 for raising and lowering the lower end of the gatherer and elevator, so that the hay will be properly picked up.

The rear end of the frame 1 carries an upper hopper 28 below the upper end of the elevator belt. The lower opening or outlet of the hopper 28 is normally closed by a door or shutter 29 hinged, as at 30, to the lower edge of the hopper 28 along the front edge of the outlet opening of the hopper. The opening movement of the door 28 is limited by means of a projection 31 extending from the hinged portion of the door 29 having a stop screw 32 threadedly engaged therethrough and arranged to contact with the hopper 28 when the door 29 is swung downwardly to a limited distance, as suggested in Fig. 2. The screw 32 may be adjusted for regulating the position at which the door 29 will stop when swung downwardly to open position.

A wing 33 is hinged, as at 34, to the lower edge of the hopper at that side of the outlet opening opposite the hinge 30, and lies in the path of the free portion of the door 29 to be swung upwardly therewith when the door 29 is closed, as suggested in Fig. 5.

As a means for normally holding the door 29 closed, and for allowing said door to swing open automatically when the hopper 28 is filled with hay, a lever 35 is fulcrumed or pivoted between its ends, as at 36, to the hopper 28 adjacent the wing 33, and one arm of the lever 35 slidably engages a stem 37 projecting rearwardly from the rear wall of the hopper 28. Springs 38 and 39 are disposed upon the stem 37 and bear against opposite sides of the lever 35. A catch 40 is pivoted to the other arm of the lever 35 and lies in the path of the free end of the door 29 whereby when the door 29 is swung upwardly to closed position, the free end of the door will strike and swing the catch 40 to swing past and over the same. The catch 40 can swing upwardly relative to the lever 35 but the downward movement of the catch 40 with respect to said lever is limited by means of a stop 41 carried by the lever 35, in order that after the door 29 is moved above the catch 40, the door will be supported by said catch. When the hopper 28 becomes filled with hay, the weight of the hay being supported by the door 29, will overcome the resistance offered by the spring 39, and as a result the lever 35 will be swung out of the way by the door 29, against the tension of the spring 39 and this allows the door 29 to swing downwardly so that the hay will drop out of the hopper. The wing 33 also swings downwardly to facilitate the proper discharge of the hay, and to prevent the hay from lodging upon the catch 40.

Carried by the rear end of the frame 1 below the hopper 28 is a rotatable receptacle 42 of sheet metal or cage construction, and having trunnions 43 projecting from opposite sides and journaled upon the rear end of the frame, whereby the receptacle 42 can be inverted. The forward side of the receptacle 42, that is when the receptacle is in upright position, is composed of a pair of doors or swinging sections 44 connected by spring hinges 45 to the body portion of the receptacle, whereby the doors 44 may swing open away from one another under certain conditions, as will hereinafter more fully appear. The spring hinges 45 will serve to swing the doors or sections 44 toward one another to closed position when the doors are released, to thus complete the receptacle.

As a means for inverting the receptacle 42, a mutilated gear wheel 46 is secured upon one trunnion 43 of the receptacle, and is provided with an arcuate series of teeth 47 extending through an arc of slightly over 180°. The teeth of the gear wheel 46 are arranged to mesh with a gear wheel 48 secured upon a short shaft 49 carried by a slide 50 movable upon the respective portion of the frame 1, and a sprocket wheel 51 is secured upon the shaft 49 and has a sprocket chain 52 passed therearound, which sprocket chain is in turn passed around a sprocket wheel 53 secured upon the axle 2.

The slide 50 is moved by means of a longitudinal rod or link 54 disposed at one side of the frame, and having its forward end pivotally connected to the arm 55 of a rock shaft 56, said rock shaft having a treadle 56$^a$ in front of the seat 27, whereby the operator may readily depress the treadle 56$^a$ for pulling the rod 54 forwardly. The operative connection between the rod 54 and slide 50 embodies a lever 57 fulcrumed as at 57$^a$ to the frame 1, the rear end of the rod 54 being engaged to one arm of the lever 57, and the other arm of the said lever being connected by a link 57' with the slide 50. The slide 50 is normally moved forwardly by means of a spring 57$^b$ exerting pressure thereagainst, whereby the gear wheel 48 is normally moved away from the gear wheel 46. When the rod 54 is moved forwardly by depressing the treadle 56$^a$, the lever 57 is swung to force the link 57' rearwardly, and this will cause the slide 50 to be moved rearwardly against the tension of the spring 57$^b$ to bring the gear wheel 48 into mesh with the gear wheel 46. This provides a clutch means for connecting and disconnecting the rotatable receptacle with the axle or driving shaft 2. It is evident that the gear wheel 48 which is operatively connected to the axle will be rotated by the axle, and when the gear wheel 48 is moved into mesh with the gear wheel 46, the receptacle 42 will be rotated to inverted position, the mouth thereof being moved rearwardly and thence downwardly.

The return movement of the receptacle is controlled at the opposite side thereof, a ratchet wheel 58 being secured upon the other trunnion 43, and a pawl or dog 59 is pivoted to the frame 1 and normally engages the ratchet wheel 58 to prevent the receptacle 42 from swinging backwardly to upright position after the receptacle has been inverted. A longitudinal rod or link 60 has its rear end engaged to the pawl 59 and has its forward end engaged to the arm 61 of a rock shaft 62 carried by the frame, the rock shaft 62 being provided with a treadle 63 in front of the seat 27, which treadle may be depressed for pulling the rod 60 forwardly to release the pawl 59 from the ratchet wheel 58. This releases the receptacle in order to allow it to return to a normal upright position.

The return of the receptacle is effected by means of an arm 64 secured to the respective trunnion 43 adjacent the ratchet wheel 58 and connected by a link 65 to a rod 66 which is pushed rearwardly by a spring 67 engaged thereto. When the receptacle is inverted, the arm 64 is swung downwardly and forwardly to move the rod 66 against the tension of the spring 67, and when the receptacle is released, the spring 67 immediately recoils and swings the arm 64 rearwardly and upwardly to return the receptacle to upright position.

The device for normally latching the doors 44 together embodies an upright bar 68 secured at the outer side of one door 44 adjacent the free edge thereof, and an upright bar 69 is slidably carried by the bar 68 and is normally raised by a spring 70 disposed between the lower end of the bar 69 and the bar 68. The latch bar 69 has hooks 71 engageable with keepers 72 attached to the other door 44 adjacent the free edge thereof, and an eccentric or cam 73 is pivoted to the upper end of the bar 68 and bears against the upper end of the latch bar 69. The cam 73 has an arm 74 projecting into the receptacle 42, whereby when the receptacle is inverted, the hay in dropping out of the receptacle will swing the arm 74, resulting in the cam 73 being rotated for moving the latch bar 69 against the tension of the spring 70 to release the hooks 71 from the keepers 72. This allows the doors 44 to swing apart. When the doors are released and swung together under the influence of the spring hinges 45, the hooks 71 snap into engagement with the keepers 72 for again latching the doors 44 together.

In order to close the door 29 of the hopper when the receptacle 42 is inverted, an upstanding bracket 75 is carried by one of the doors 44, and a lever or tappet 76 is pivoted between its ends to the bracket 75. A roller 77 is pivoted to the upper end of the lever 76, and a weight 78 is carried by the lower end of said lever, the lever 76 being arranged to swing in one direction relative to the bracket 75, but being prevented from swinging in the other direction due to the contact of the weighted arm of the lever 76 with the bracket 75. When the receptacle 42 is inverted with the door 29 open, the roller 77 of the lever 76 contacts with and rolls along the door 29, and will swing said door upwardly to closed position so that the door 29 will be held closed by the catch 40.

The receptacle 42 is provided with means for holding the hay therein during the time that the receptacle is inverted, to prevent the premature discharge of the hay. This means includes a pair of levers or shanks 79, pivoted, as at 80, to opposite sides of the receptacle 42 adjacent the mouth thereof, said levers 79 having slots 81 in their remote arms and forks 82 upon their adjacent arms. The forks 82 normally project upwardly, and are adapted to be swung over or within the mouth of the receptacle. Vertical rods 83 are slidable through U-shaped brackets 84 secured to the opposite sides of the receptacle, and the upper ends of the rods 83 have pins 83$^a$ working in the slots 81, whereby when the rods 83 are slid, the levers 79 are swung. Arms 84' are connected by rule joints to the lower ends of the rods 83 and have rollers 84$^a$ at their free ends to ride over cams 85 secured by stays 85' to the frame 1. The upper ends of the cams 85 have inclines 85$^a$ up which the arms 84' ride when the receptacle 42 is tilted. The rule joints between the arms 84' and rods 83 permit the arms 84' to swing in one direction out of alinement with the rods 83, but prevent the arms 84' from swinging in the other direction. Expansion coiled wire springs 86 are disposed between the rods 83 and upper arms of the brackets 84 for yieldably depressing the rods 83 to raise the forks 82. When the receptacle is tilted, the arms 84' ride up the inclines 85$^a$, thus pushing the rods 83 upwardly, for swinging the forks 82 over or within the mouth of the receptacle to hold the hay within the receptacle, and then during the time that the receptacle is being inverted, the rollers 84$^a$ in passing around the cams 85 about arcs having the trunnions 43 as centers, the forks 82 are held stationary within the mouth of the receptacle. When the receptacle is completely inverted, the arms 84' reach the lower ends of the cams and move beyond the same, so that the springs 86 come into play for swinging the forks 82 away from the mouth of the receptacle, to allow the hay to drop onto the ground without interference. When the receptacle is restored to initial position, the arms 84' can swing backwardly so as to pass around the cams 85 without swinging the forks, the joints between the arms 84' and rods 83 breaking when the parts are returned to original position.

In operation, the door 29 is normally closed, and the receptacle 42 is in upright position with the doors 44 thereof closed and latched together. The gear wheel 48 is also disengaged from the gear wheel 46. Now, when the machine is drawn over the ground, the hay is caught and elevated by the elevator, as will be obvious, the operator controlling the adjustment of the elevator by means of the hand lever 26, so that the hay will be properly gathered. The hay which is carried upwardly by the elevator is discharged into the hopper 28, and the hay accumulated within the hopper. When the weight of the hay within the hopper overcomes the tension of the spring 39, the door 29 swings open, allowing the hay to drop from the hopper into the receptacle 42. When the operator observes or hears the discharge of the hay from the hopper into the receptacle 42, he depresses the treadle 56ª which brings the gear wheel 48 into mesh with the gear wheel 46, and this serves to rotate the receptacle to inverted position. During the time that the receptacle is being inverted, the lever or tappet 76 engages the door 29 and swings the same backwardly to closed position, and the levers 79 are swung by the cam 85 to swing the forks or retainers 82 into the mouth of the receptacle for holding the hay within the receptacle while the receptacle is being inverted. This prevents a premature dumping of the hay. When the receptacle is inverted, the rotary movement thereof is stopped, due to the gear wheel 48 reaching the end of the teeth 47 of the gear wheel 46. At the same time, the levers 79 are released to allow the forks 82 to swing downwardly, and this permits the hay to drop onto the ground. When the hay drops, it swings the arm 74 downwardly therewith, it being kept in mind that the receptacle is inverted, and this releases the latch bar 69 from the keepers 72, which enables the doors 44 of the receptacle to swing apart when the receptacle 42 moves away from the cock of hay C deposited on the ground. In this way, the receptacle will leave the cock of hay without disturbing the hay, it being preferable to secure wiping arms 87 to the doors 44 which project beyond the free ends of the doors, so that said arms 87 in passing along the sides of the cock C, as suggested in Fig. 3, will hold the doors 44 open until after they have left the cock of hay. The arms 87 normally swing within the opposite doors 44 when the doors are closed. After the receptacle has left the cock of hay, the doors 44 are closed by the spring hinges 45, and are latched together as above intimated. The receptacle 42 is held in inverted position by the pawl 59 engaging the ratchet wheel 58 and after the receptacle has left the cock of hay, the operator depresses the treadle 63 to release the pawl 59, whereby the receptacle 42 will be returned to upright or initial position under the influence of the spring 67. The receptacle is then in position to receive the new charge of hay from the hopper 28, it being noted that during the time that the receptacle is inverted and discharged, the hopper is being filled with hay, so that the machine can continually gather and elevate the hay without interruption.

The present machine thus enables the hay to be gathered and cocked, which is far superior to the ordinary method of first windrowing the hay and then manually cocking the same. Furthermore, the cocks formed by the present machine will have the hay so arranged, that rain will be shed by the hay much more effectively than by the ordinary cocks of hay.

Having thus described the invention, what is claimed as new is:

1. A hay cocker embodying a hopper, means for gathering and elevating hay into said hopper, a hinged door for the hopper outlet, a catch for normally holding said door closed and adapted to release said door when the hopper is filled, a rotatable hay receptacle below the hopper to receive the hay therefrom, means for inverting the receptacle and returning it to initial position, and means for closing said door when the receptacle is inverted.

2. A hay cocker embodying a hopper, means for gathering and elevating hay into said hopper, a hinged door for the hopper outlet, a catch for normally holding said door closed and adapted to release said door when the hopper is filled, a rotatable hay receptacle below the hopper to receive the hay therefrom, means for inverting the receptacle and returning it to initial position, and means carried by the receptacle and engageable with said door when the receptacle is inverted for closing said door.

3. In a device of the character described, a hopper, means for gathering and elevating hay into said hopper, a door hinged to the hopper and normally closing the outlet thereof, a lever pivoted to the hopper, a catch pivoted to said lever for engaging and holding the door in closed position, a spring coöperating with said lever for normally holding the door closed and allowing the door to swing open when the hopper is filled, and a rotatable hay receptacle below the hopper.

4. A hay cocker comprising a hopper, means for gathering the hay and elevating it into the hopper, a door and a wing hinged to the hopper at the opposite sides of the outlet thereof, the wing being arranged to be swung upwardly by the free portion of the door when the door is closed, a catch carried by the hopper adjacent the wing and engageable with the free end of the door for holding the door closed and for permitting the door to swing open when the hopper is filled, and a rotatable hay receptacle below the hopper.

5. In a hay cocker, a rotatably mounted hay receptacle having a hinged door adapted to be swung open by a cock of hay after the receptacle is inverted and when the receptacle passes off of a cock of hay deposited thereby, means for normally latching said door in closed position, and means in the path of the falling hay for unlatching the door arranged to be operated by the hay which falls from the inverted receptacle.

6. In a hay cocker, a rotatably mounted hay receptacle adapted to be inverted and having a pair of doors adapted to be swung open by a cock of hay after the receptacle is inverted and when the receptacle passes off of a cock of hay deposited thereby, a latch device for latching the doors together when they are closed, and means for unlatching the doors having a portion projecting into the path of the hay which drops from the receptacle, so that the hay in dropping will unlatch the doors automatically.

7. In a hay cocker, a rotatable receptacle having a pair of doors adapted to be swung open by a cock of hay after the receptacle is inverted and when the receptacle passes off of a cock of hay deposited thereby, a latch device for latching the free ends of the doors together when they are closed and including an arm projecting into the receptacle into the path of the hay dropping from the receptacle when inverted, said arm when swung downwardly operating to unlatch the doors automatically when the hay is dropped from the receptacle.

8. In a hay cocker, an invertible hay receptacle, a lever pivoted to one side thereof and having a retaining fork removable into the mouth of the receptacle for holding the hay therein, a slidable rod carried by the receptacle and operatively connected with said lever, spring means for normally holding said fork out of the mouth of the receptacle, an arm pivoted to said rod and limited to swing in one direction only, and a cam with which said arm is coöperable, the arm remaining fixed relative to the rod when the receptacle is inverted so that the fork is swung into the mouth of the receptacle, and said arm swinging when the receptacle is returned to avoid the movement of the fork.

In testimony that I claim the foregoing as my own, I have hereto affixed my signature in the presence of two witnesses.

CHARLES A. PITTS.

Witnesses:
  CHARLES FARRINGTON,
  EARLE I. STRICKLAND.

Copies of this patent may be obtained for five cents each, by addressing the "Commissioner of Patents, Washington, D. C."